(12) United States Patent
Yamada et al.

(10) Patent No.: US 6,831,709 B2
(45) Date of Patent: Dec. 14, 2004

(54) LIQUID CRYSTAL DISPLAY DEVICE WITH LIGHT-SHIELDING MEMORY WIRINGS FOR STORING DISPLAY DATA

(75) Inventors: Yoshitaka Yamada, Kumagaya (JP); Yasuyuki Hanazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 10/083,479

(22) Filed: Feb. 27, 2002

(65) Prior Publication Data

US 2002/0118327 A1 Aug. 29, 2002

(30) Foreign Application Priority Data

Feb. 28, 2001 (JP) ........................................ 2001-055524

(51) Int. Cl.[7] ............................................. G02F 1/136
(52) U.S. Cl. ........................ 349/44; 349/113; 349/114; 349/110; 349/111
(58) Field of Search ........................... 349/44, 113, 114, 349/110, 111

(56) References Cited

U.S. PATENT DOCUMENTS

| 5,654,811 A | * | 8/1997 | Spitzer et al. ............... 349/106 |
| 6,433,767 B1 | * | 8/2002 | Murade ....................... 345/92 |
| 2001/0007489 A1 | * | 7/2001 | Umemoto et al. .......... 349/113 |

* cited by examiner

Primary Examiner—Toan Ton
Assistant Examiner—George Y. Wang
(74) Attorney, Agent, or Firm—Pillsbury Winthrop LLP

(57) ABSTRACT

A liquid crystal display panel is arranged such that a reflection member overlaps a light-shielding wiring pattern such that apertures are left unmasked. This prevents light use efficiency from being decreased due to a light-shielding wiring pattern having memory wiring layers. An array substrate includes a transparent electrode which applies a field to a liquid crystal layer, a light-shielding wiring pattern having one or more apertures which allow transmission of light incident on the liquid crystal layer from the reverse side of the array substrate, and a reflection member which reflects incident light applied from a counter substrate side through the liquid crystal layer.

14 Claims, 4 Drawing Sheets

LIQUID CRYSTAL DISPLAY DEVICE WITH LIGHT-SHIELDING MEMORY WIRINGS FOR STORING DISPLAY DATA

CROSS-REFERENCE TO RELATED APPLICATIONS

This application is based upon and claims the benefit of priority from the prior Japanese Patent Application No. 2001-055524, filed Feb. 28, 2001, the entire contents of which are incorporated herein by reference.

BACKGROUND OF THE INVENTION

1. Field of the Invention

The present invention generally relates to a liquid crystal display panel which uses both transmission light and reflection light to display an image, and more particularly to a liquid crystal display in which each pixel comprises a static memory or the like for storing display data.

2. Description of the Related Art

Conventionally, mobile communication terminals, including portable phones and pagers, employ a display panel capable of displaying a simple character image of numerals and letters. In general, the display panel for this purpose has the properties of compact size, light weight, thinness, and low power consumption. With the remarkable progress in information technology, the capability of displaying a high-resolution color graphic image is also demanded for the display panel.

A reflection-type active matrix liquid crystal display panel is regarded as a promising type of display panel that can satisfy the demand described, and has been put into practical use in some kinds of mobile communication terminals. Such a liquid crystal display panel has a configuration in which an image is displayed by reflecting external light and optically modulating it, and thus requires no internal light source. With this configuration, a fine pixel structure can be achieved without restrictions being imposed by the need to allow transmission of light from an internal light source. Meanwhile, a problem arises in that visibility of the displayed image decreases significantly in the dark as compared with outdoors in daylight.

The above-mentioned problem can be remedied without requiring any modification to the pixel structure by means of a front light system having a transparent surface light source disposed on the front side of the display screen, for example. In this case, the surface light source serves as a subsidiary internal light source which compensates for a shortage of illumination provided by the external light. The front light system, however, requires a precise patterning process of transparent resin in order to uniformly deliver light from the surface light source to all the pixels, thus increasing the cost. As for the quality of the image, a decrease in the brightness, blurring of the image, an increase in image depth, etc., occur since the image is displayed with the reflection light transmitted through the transparent resin.

Jpn. Pat. Appln. KOKAI Publication No. 11-316382 discloses a liquid crystal display panel that uses both transmission light and reflection light to display an image. As shown in FIG. 8, in the display panel, each pixel includes a reflection area RA for reflecting external light and a transmission area TA for transmitting light emitted from a backlight unit BL. The reflection area RA is obtained by a pixel electrode RE of a metallic material, while the transmission area TA is obtained by a transparent pixel electrode TE of ITO which is formed within an opening provided as a void space surrounded by the pixel electrode RE. In a bright environment, such as outdoors in daylight, an image is displayed with the reflection light from the pixel electrode RE. On the other hand, in a dark environment, such as at night, an image is displayed with not only the reflection light reflected from the pixel electrode RE but also the transmission light transmitted through the transparent pixel electrode TE. It should be noted that the backlight unit BL is provided as a subsidiary internal light source which supplements a shortage of illumination provided by the external light, and the structure of the display panel tends to be restricted by the requirements for transmission of the light from the backlight unit BL.

The SRAM (Static Random Access Memory) technology is conventionally known as means for reducing the power consumption in a liquid crystal display panel for the mobile communication terminal. With this SRAM technology, each pixel has a wiring structure providing a static memory which stores display data supplied from a driving circuit via a polysilicon thin film transistor. For example, when a still image is displayed, update of the display data is not required. Accordingly, after the static memory has stored the display data from the driving circuit, the output operation of the driving circuit can be suspended so as to reduce the power consumption.

Memory wirings are formed of a light-shielding metallic material like signal lines XL, scanning lines YL, and wirings for thin film transistors SW for pixels, which are formed together with the memory wirings in a polysilicon TFT process recently put into a practical use. The area of the memory wirings occupies a large part of the pixel. Thus, when the transmission area TA is provided as a single and large window located at the center of the pixel, the memory wirings shield part of the transmission light to be transmitted through the transparent pixel electrode TE, and cause the effective transmission area to be significantly reduced in comparison with the area of the transparent pixel electrode TE. For this reason, an increase in the brightness of the backlight unit BL is required for attaining an image of a desired brightness, and this inevitably increases the power consumed by the liquid crystal display panel. This problem makes it difficult for the SRAM technology to be applied to the liquid crystal display panel that uses both reflection light and transmission light.

BRIEF SUMMARY OF THE INVENTION

The present invention has been made in consideration of the above problems, and an object of the invention is to provide a liquid crystal display panel which can prevent the light use efficiency from being decreased due to light-shielding memory wirings applied to a display system that uses both reflection light and transmission light.

The present invention provides a liquid crystal display panel which comprises light-transmitting first and second electrode substrates, and a liquid crystal layer held between the first and second electrode substrates and containing liquid crystal molecules whose alignment is controlled from the first and second electrode substrates. The first electrode substrate includes an electrode which applies an electric field to the liquid crystal layer; a thin film transistor formed as a switching element for the electrode; a light-shielding wiring pattern having a plurality of memory wiring layers connected to the electrode and the thin film transistor, and one or more apertures which allow transmission of light from a rear side of the first electrode substrate; and a reflection member which reflects incident light applied from a second electrode substrate side through the liquid crystal layer, and overlaps the light-shielding wiring pattern such that the one or more apertures are left unmasked.

In the liquid crystal display panel of the present invention, the reflection member overlaps the light-shielding wiring pattern such that the one or more apertures are left unmasked. In this case, a decrease in the light use efficiency can be prevented by determining the layout of the light-shielding wiring pattern so as not to adversely affect the effective transmission area for the transmission light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display panel according to the first embodiment of the present invention will now be described with reference to the accompanying drawings. The liquid crystal display panel is configured to display an image, using both transmission light and reflection light.

Figure 1:
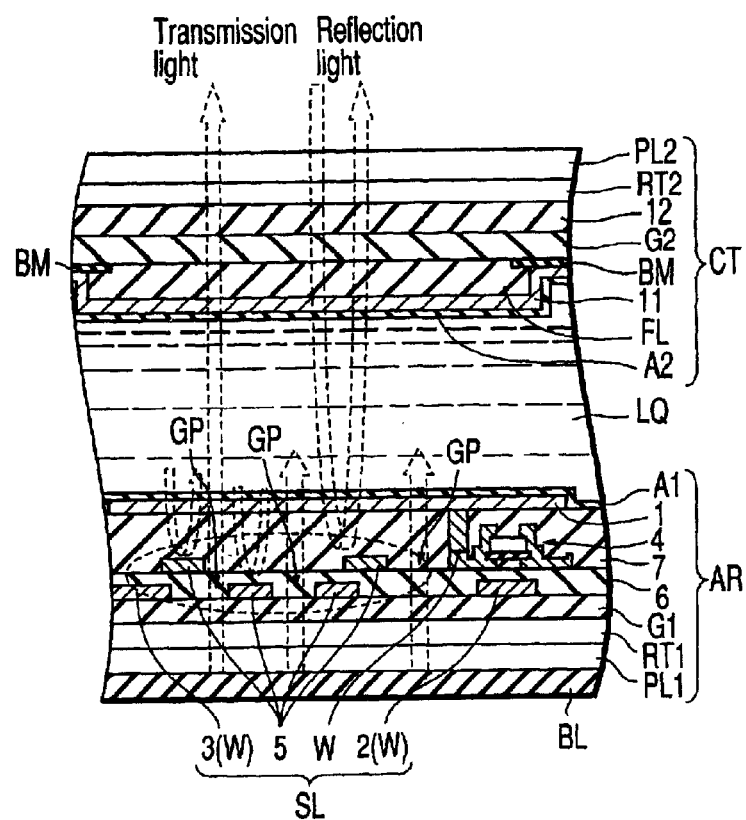
FIG. 1 is a sectional view showing part of a liquid crystal display panel according to the first embodiment of the present invention.

FIG. 1 shows a sectional structure of part of the liquid crystal display panel. As shown in FIG. 1, the liquid crystal display panel comprises an array substrate AR serving as a first light-transmitting electrode substrate, a counter plate CT serving as a second light-transmitting electrode substrate, a liquid crystal layer LQ which is held between the substrates AR and CT as a liquid crystal cell and contains liquid crystal molecules whose alignment is controlled from the substrates AR and CT, and a backlight unit BL disposed on the rear side of the array substrate AR as a subsidiary internal light source.

The array substrate AR includes a transparent insulating substrate G1, a plurality of transparent pixel electrodes 1 which are arrayed in a matrix and apply electric fields to the liquid crystal layer LQ, a plurality of scanning lines 2 formed along the rows of the transparent pixel electrodes 1, a plurality of signal lines 3 formed along the columns of the transparent pixel electrodes 1, a plurality of thin film transistors (TFT) 4 which are formed near intersections of the scanning lines 2 and the signal lines 3 and serve as pixel switching elements, a plurality of memory wiring layers 5 providing static memories each connected between a corresponding thin film transistor 4 and a corresponding pixel electrode 1, an alignment film A1 covering the pixel electrodes 1, a ¼-wavelength retardation plate RT1 affixed to the transparent insulating substrate G1, and a linearly-polarizing plate PL1 affixed to the ¼-wavelength retardation plate RT1. The counter substrate CT includes a transparent insulating substrate G2, a color filter FL having a pattern of strips which face the columns of the pixel electrodes 1, a light-shielding layer BM for shielding light leaking from the peripheral region of each pixel electrode 1, a transparent counter electrode 11 which covers the color filter FL and the light-shielding layer BM and faces the pixel electrodes 1, an alignment film A2 covering the transparent opposing electrode 11, a light diffusion layer 12 which covers the rear side of the transparent insulating substrate G2 and diffuses light, a ¼-wavelength retardation plate RT2 affixed to the light diffusion layer 12, and a linearly-polarizing plate PL2 affixed to the ¼-wavelength retardation plate RT2.

In the liquid crystal display panel described above, each thin film transistor 4 is set to the conductive state in response to a scanning pulse from a corresponding scanning line 2 and supplies display data on a corresponding signal line 3 to a corresponding static memory. The static memory stores the display data to apply a pixel potential corresponding to the display data to a corresponding pixel electrode 1. In that pixel area of the liquid crystal layer LQ which corresponds to the pixel electrode 1, the alignment of liquid crystal molecules is controlled by an electric field determined according to the difference between the pixel potential and the potential of the counter electrode 11. The transmittance of the pixel is set based on the alignment of the liquid crystal molecules.

In the array substrate AR, the thin film transistors 4 are formed of polycrystalline silicon, amorphous silicon or monocrystalline silicon. The memory wiring layers 5 are associated with control wiring layers W for the thin film transistors, such as the scanning lines 2 and the signal lines 3, to form a light-shielding wiring pattern SL. The pixel electrodes 1 are located closer to the liquid crystal layer LQ than the light-shielding wiring pattern SL. The gaps between the control wiring layers W and the memory wiring layers 5 serve as apertures GP which are provided in the light-shielding wiring pattern SL and allow transmission of incident light applied from the rear side of the array substrate AL toward the liquid crystal layer LQ. The surfaces of the memory wiring layers 5 and the surfaces of the control wiring layers W serve as a reflection member which reflects incident light applied through the liquid crystal layer LQ from the counter substrate CT side, and overlaps the light-shielding wiring pattern SL such that the apertures GP are left unmasked. The memory wiring layers 5 and the control wiring layers W are formed of the same kind of metallic material, such as aluminum, so that the reflection member has a reflection characteristic in which more than 40% of the incident light is reflected. The scanning lines 2 and signal lines 3 are formed on the transparent insulating substrate G1 together with some of the memory wiring layers 5, and are covered with an interlayer insulating film 6. The thin film transistors 4 are formed on this interlayer insulating film 6 together with the remainder of the memory wiring layers 5, and are covered with an organic insulating film 7. The pixel electrodes 1 are conductive layers of ITO formed on the organic insulating layer 7.

The display operation of the aforementioned liquid crystal display panel will be described below. The liquid crystal display panel has a bright display mode set in a state where no voltage is applied to the liquid crystal layer LQ from the pixel electrode 1 and the counter electrode 11, and a dark display mode set in a state where a voltage is applied to the liquid crystal layer LQ from the pixel electrode 1 and the counter electrode 11.

In the bright display mode using external light, the external light is circularly-polarized by passing through the linearly-polarizing plate PL2 and ¼-wavelength retardation plate RT2 of the counter substrate CT, and then incident on the liquid crystal layer LQ. The light emerges from the liquid crystal layer LQ in a linearly-polarized state, and is then reflected by the reflection member, i.e., the light-shielding wiring pattern SL. The thickness of the liquid crystal layer LQ is determined such that the liquid crystal layer LQ has similar effects as those of the ¼-wavelength retardation plate RT2. Therefore, the reflected light emerges from the liquid crystal layer LQ in a circularly-polarized state, so that it is linearly-polarized by the ¼-wavelength retardation plate RT2 to have an axis parallel to the polarization axis of the linearly-polarizing plate PL2. After passing through the ¼-wavelength retardation plate RT2, the reflected light also passes through the linearly-polarizing plate PL2. On the other hand, in the dark display mode using external light, the external light is circularly-polarized by passing through the linearly-polarizing plate PL2 and ¼-wavelength retardation plate RT2, and is then incident on the liquid crystal layer LQ in a circularly-polarized state. The light is reflected by the reflection member, i.e., the light-shielding wiring pattern SL, without its phase being changed by the liquid crystal layer LQ. The reflected light emerges from the liquid crystal layer LQ in a circularly-polarized state, so that it is linearly-polarized by the ¼-wavelength retardation plate RT2 to have an axis orthogonal to the polarization axis of the linearly-polarizing plate PL2. Thus, after passing through the ¼-wavelength retardation plate RT2, the reflected light is shielded by the linearly-polarizing plate PL2.

In the bright display mode using backlight from the backlight unit BL, the backlight passes through the linearly-polarizing plate PL1 and ¼-wavelength retardation plate RT1 of the array substrate AR, and is then incident on the light-shielding wiring pattern SL in a circularly-polarized state. The incident light passes through the apertures GP of the light-shielding wiring pattern SL as transmission light, and emerges from the liquid crystal layer LQ in a linearly-polarized state. The transmission light is circularly polarized by the ¼-wavelength retardation plate RT2, and thus passes through the linearly-polarizing plate PL2. In the dark display mode using backlight from the backlight unit BL, the backlight passes through the linearly-polarizing plate PL1 and ¼-wavelength retardation plate RT1 of the array substrate AR, and is then incident on the light-shielding wiring pattern SL in a circularly-polarized state. The incident light passes through the apertures GP of the light-shielding wiring pattern SL as transmission light, and emerges from the liquid crystal layer LQ without its phase being changed. The transmission light is linearly-polarized by the ¼-wavelength retardation plate RT2 to have an axis orthogonal to the polarization axis of the linearly-polarizing plate PL2. As a result, the transmission light is shielded by the linearly-polarizing plate PL2.

As described above, in the liquid crystal display panel of the first embodiment, the array substrate AR includes the memory wiring layers 5 providing a static memory connected between the thin film transistor 4 and the pixel electrode 1. Since the static memory can stores display data supplied thereto from the signal line 2 via the thin film transistor 4, the power consumption can be reduced remarkably during the display operation of a still image. In addition, the memory wiring layers 5 are associated with the control wiring layer W to form the light-shielding wiring pattern SL having apertures GP through which the light from the rear side of the array substrate AR is transmitted toward the liquid crystal layer LQ. In particular, the light-shielding wiring pattern SL serves as a reflection member which reflects the light incident from the counter substrate CT side through the liquid crystal layer LQ. Therefore, a decrease in the light use efficiency can be prevented by determining the layout of the light-shielding wiring pattern SL so as not to adversely affect the effective transmission area for the transmission light. To be more specific, the transmittance is about three times that of a conventional liquid crystal display panel. In addition, since the memory wiring layers 5 and the control wiring layers W are formed of the same metallic material, part of the memory wiring layers 5 can be formed on the transparent insulating substrate G1 together with the scanning line 2 and the signal line 3, and the remaining part of the memory wiring layers 5 can be formed on the interlayer insulating film 6 together with the thin film transistor 4. Furthermore, the light diffusion layer 12 is formed on the counter substrate CT side, so that the viewing angle dependency of reflection light can be suppressed. In addition, this structure can be used even in a situation where the reflection member is unable to have undulations due to restrictions imposed by the layout of the light-shielding wiring pattern SL and the characteristics of the metallic material.

Figure 2:
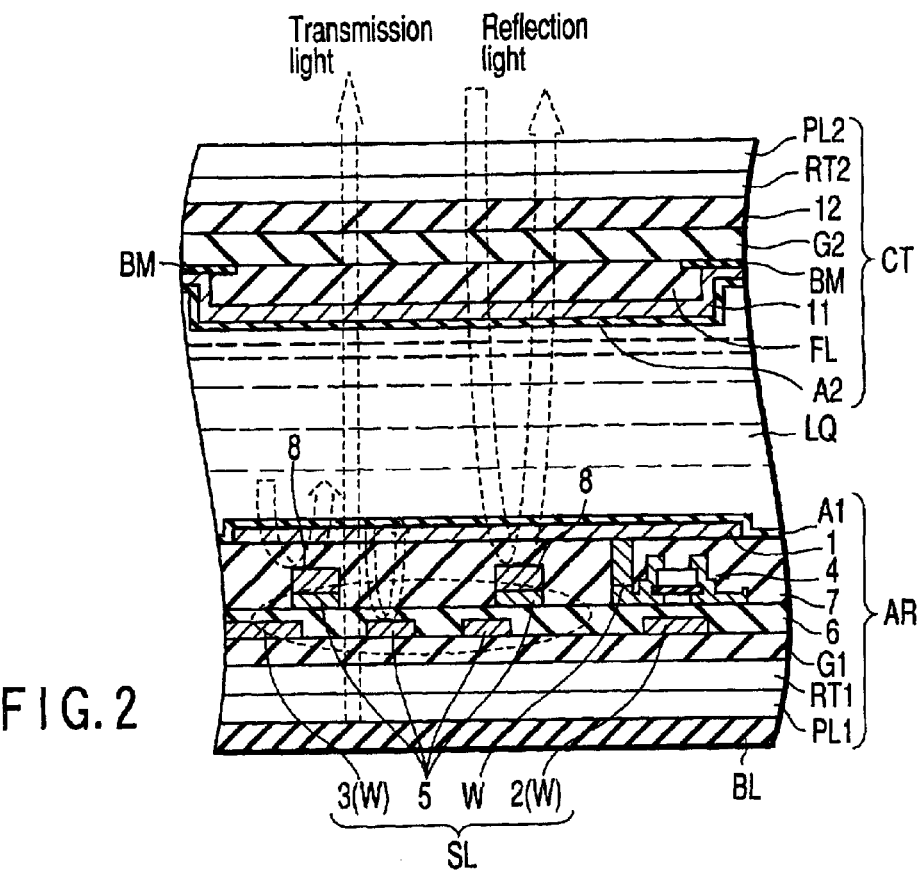
FIG. 2 is a sectional view showing part of a liquid crystal display panel according to the second embodiment of the present invention.

FIG. 2 is a sectional view showing part of a liquid crystal display panel according to the second embodiment of the present invention. Except for the structures described below, the liquid crystal display panel of the second embodiment is similar to that of the first embodiment. In FIG. 2, therefore, similar or corresponding structural elements are denoted by the same reference numerals as used in FIG. 1, and reference to such structural elements will be omitted.

The liquid crystal display panel of the second embodiment further comprises reflective material layers 8 stacked on the memory wiring layers 5 which are formed on the interlayer insulating film 6. The reflective material layers 8 are formed of a highly reflective metallic material containing silver as its major component. The reflective material layers 8, the control wiring layers W and the memory wiring layers 5 on the transparent insulating substrate G1 are associated with each other to form a reflection member that reflects more than 80% of incident light. As a result of this structure, the brightness of an image displayed by using reflection light can be improved by more than 50% compared with that of the liquid crystal display panel shown in FIG. 1. It should be noted that the highly reflective metallic material is not limited to a silver-based metallic material; it may be an aluminum-based metallic material.

Figure 3:
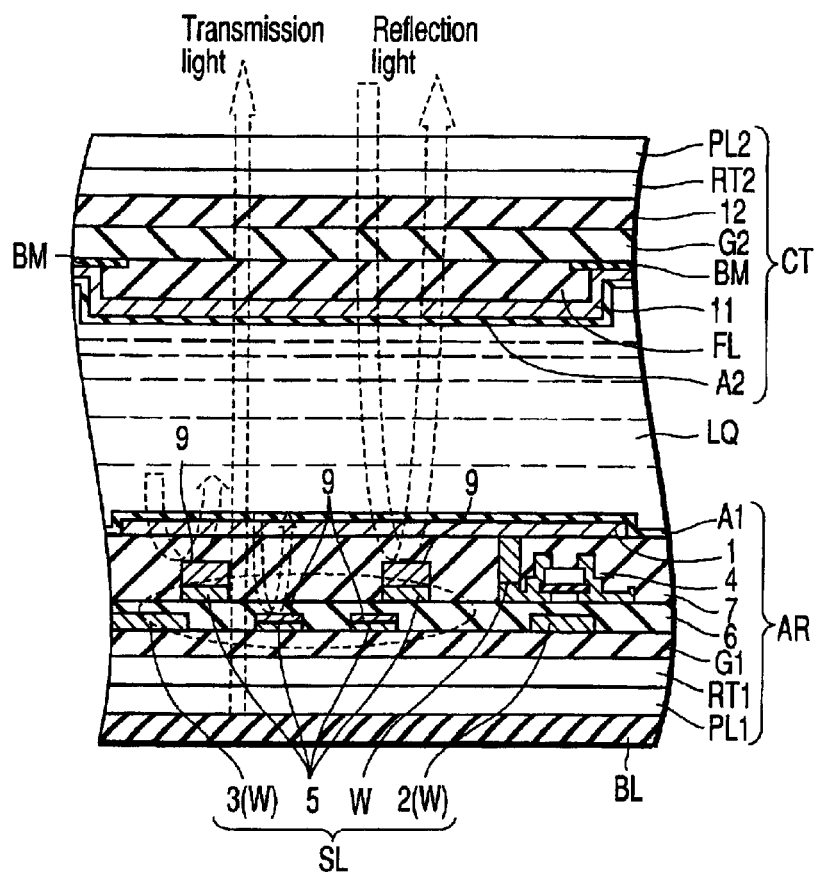
FIG. 3 is a sectional view showing part of a liquid crystal display panel according to the third embodiment of the present invention.

FIG. 3 is a sectional view showing part of a liquid crystal display panel according to the third embodiment of the present invention. Except for the structures described below, the liquid crystal display panel of the third embodiment is similar to that of the first embodiment. In FIG. 3, therefore, similar or corresponding structural elements are denoted by the same reference numerals as used in FIG. 1, and reference to such structural elements will be omitted.

The liquid crystal display panel of the third embodiment further comprises reflective material layers 9 stacked on the memory wiring layers 5 formed on the interlayer insulating film 6 and the organic insulating film 7. The reflective material layers 9 are formed of a high-melting point metallic material containing an alloy of molybdenum and tungsten as its major component. The reflective material layers 9 are associated with the control wiring layer W to form a reflection member. The reflective material layers 9 differ from the reflective material layers 8 shown in FIG. 2 since they are not used for improving the brightness of an image displayed by using the reflection light. The reflective material layers 9 are used for improving the reliability of the reflection member with respect to the metallic material of the memory wiring layers 5. It should be noted that the high-melting point metallic material is not limited to a material containing an alloy of both molybdenum and tungsten as its major component. For example, it may be a molybdenum-based or tungsten-based material.

Figure 4:
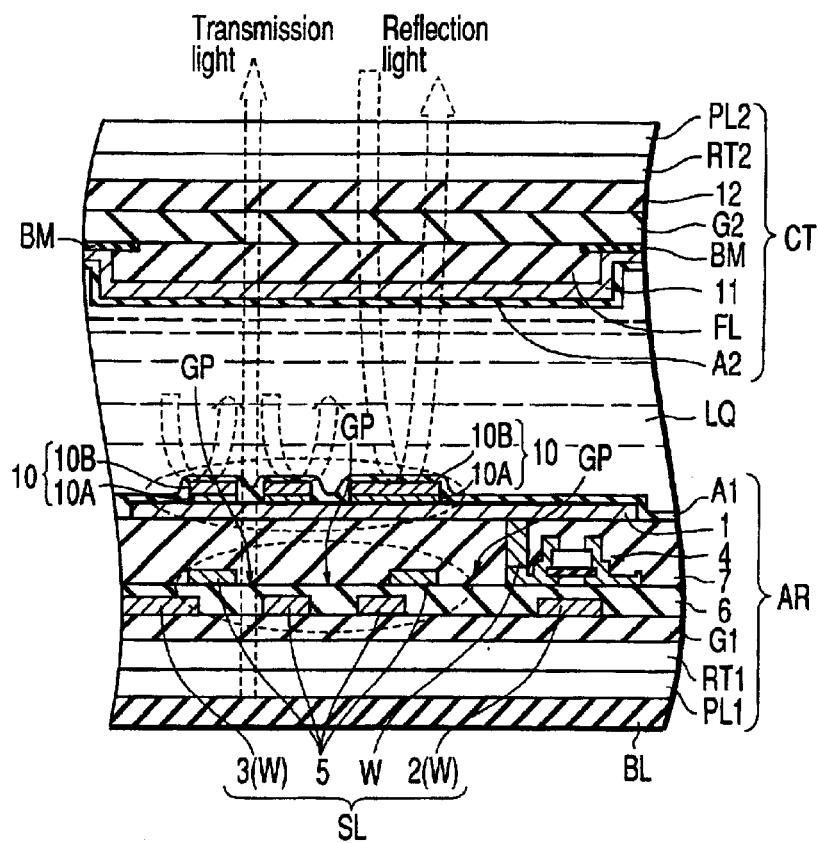
FIG. 4 is a sectional view showing part of a liquid crystal display panel according to the fourth embodiment of the present invention.

FIG. 4 is a sectional view showing part of a liquid crystal display panel according to the fourth embodiment of the present invention. Except for the structures described below, the liquid crystal display panel of the fourth embodiment is similar to that of the first embodiment. In FIG. 4, therefore, similar or corresponding structural elements are denoted by the same reference numerals as used in FIG. 1, and reference to such structural elements will be omitted.

The liquid crystal display panel of the fourth embodiment further comprises reflective material layers 10 of a double-layered structure formed on the transparent pixel electrodes 1 of ITO. To be more specific, each reflective material layer 10 includes a lower metallic layer 10A which is in contact with the pixel electrode 1, and an upper metallic layer 10B which is in contact with the lower metallic layer 10A. The lower metallic layer 10A is formed of a high-melting point metallic material, such as molybdenum, while the upper metallic layer 10B is formed of a highly reflective metallic material containing aluminum as its major component. The reflective material layers are disposed to overlap mainly with the memory wiring layers 5. Preferably, the total area of the reflective material layers 10 accounts for more than 60% of the total area of the memory wiring layers 5.

In the liquid crystal display panel of the fourth embodiment, the reflective material layers 10 are located closer to the liquid crystal layer LQ than the transparent pixel electrodes 1. With this structure, the upper metallic layers 10B suppress the attenuation of the light reflected by the upper metallic layers 10B. On the other hand, the lower metallic layers 10A, formed of, e.g., molybdenum, improve the contact strength between the ITO of the pixel electrodes 1 and the aluminum of the upper metallic layers 10B. The reflective material layers 10 improve the brightness of an image displayed by means of reflection light while maintaining the reliability of the reflection member, which may be impaired due to the metallic material of the memory wiring layers 5. The brightness is improved by about 30% compared with that the liquid crystal display panel shown in FIG. 1. The reflective material layers 10 are formed as islands or stripes on the transparent pixel electrode 1. It is necessary that the reflective material layers 10 be formed not to overlap with the apertures GP through which light from the backlight unit BL is transmitted. Nevertheless, the layout pattern of the reflective material layers 10 is hardly restricted by the peripheral structure of the memory wiring layers 5. Hence, the layout pattern can be determined with a higher degree of freedom than the reflective material layers 8 and 9 of the embodiments shown in FIGS. 2 and 3. This facilitates the design process of optically optimizing the layout pattern.

The reflective material layers 10 on the transparent pixel electrodes 1 preferably have the double-layered structure described above but are not limited thereto. For example, they may have a single-layer structure formed of a highly reflective metallic material containing aluminum as its major component. Moreover, the liquid crystal display panel may be of a structure wherein the transparent pixel electrode 1 is interposed between the reflective material layer 10 and the liquid crystal layer LQ. Such a structure can be obtained by stacking a lower metallic layer 10A, an upper metallic layer 10B and a transparent pixel electrode 1 on an organic insulating film 7 in this order.

Figure 5:
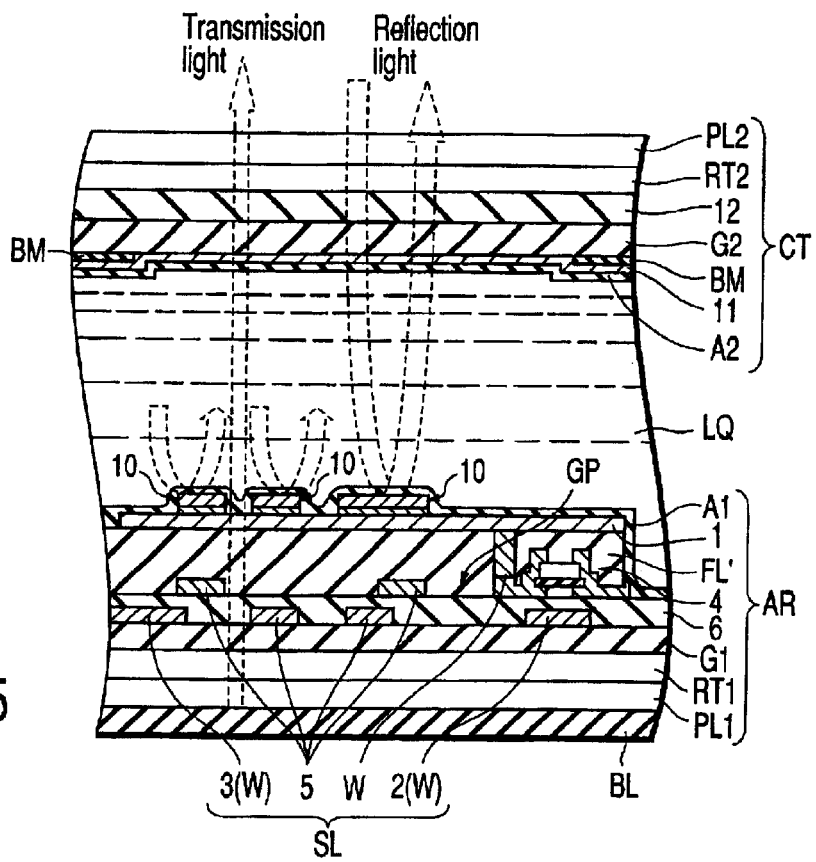
FIG. 5 is a sectional view showing part of a liquid crystal display panel according to the fifth embodiment of the present invention.

FIG. 5 is a sectional view showing part of a liquid crystal display panel according to the fifth embodiment of the present invention. Except for the structures described below, the liquid crystal display panel of the fifth embodiment is similar to that of the fourth embodiment. In FIG. 5, therefore, similar or corresponding structural elements are denoted by the same reference numerals as used in FIG. 4, and reference to such structural elements will be omitted.

As shown in FIG. 5, the liquid crystal display panel comprises a color filter FL' of a striped pattern provided on the array substrate AR side. In the liquid crystal panel of this embodiment, the color filter FL shown in FIG. 4 is eliminated from the counter substrate CT, and the organic insulating film 7 shown in FIG. 4 is replaced by the color filter FL'. Hence, the formation process of the organic insulating film 7 is not required in the manufacture of the array substrate AR. Like the color filter FL shown in FIG. 4, the color filter FL' has a striped pattern, and the pixel electrodes of each column are formed directly on the color filter FL'. Therefore, the alignment margin between the color filter FL' and the pixel electrode 1 can be reduced. Because of this, a high-resolution liquid crystal display panel can be obtained at a cost lower than that of the embodiment shown in FIG. 1.

Figure 6:
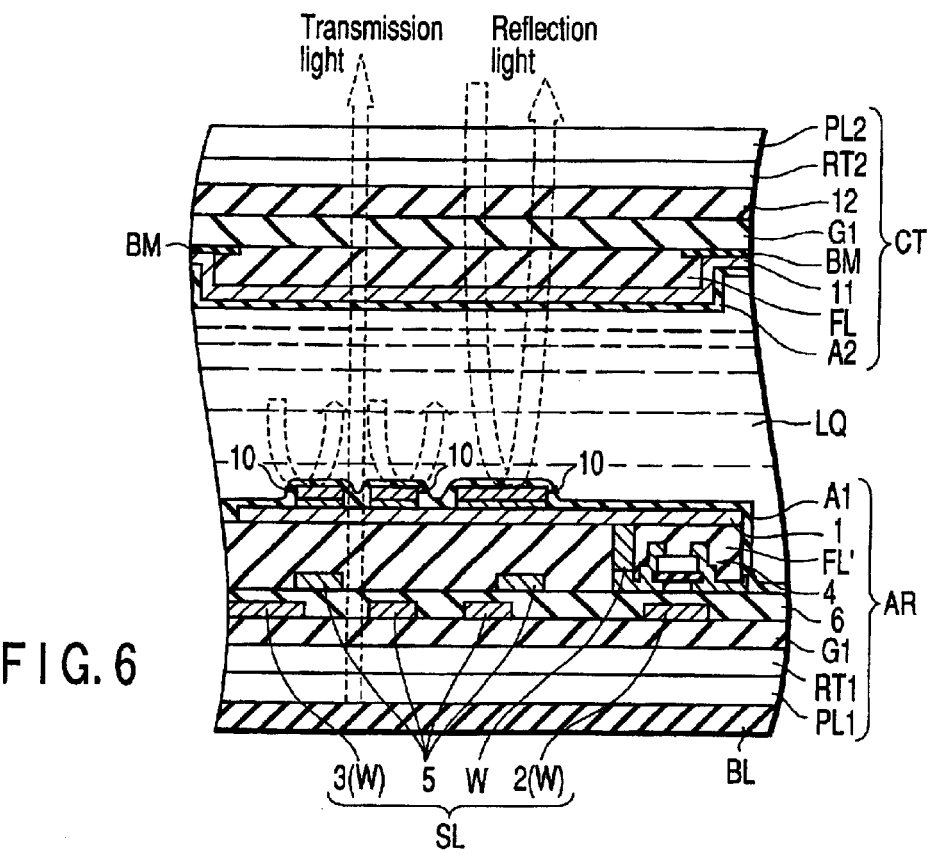
FIG. 6 is a sectional view showing part of a liquid crystal display panel according to the sixth embodiment of the present invention.

FIG. 6 is a sectional view showing part of a liquid crystal display panel according to the sixth embodiment of the present invention. Except for the structures described below, the liquid crystal display panel of the sixth embodiment is similar to that of the fourth embodiment. In FIG. 6, therefore, similar or corresponding structural elements are denoted by the same reference numeral as used in FIG. 4, and reference to such structural elements will be omitted.

The liquid crystal panel comprises a stripe-shaped color filter FL' formed on the array substrate AR in addition to a color filter FL formed, as shown in FIG. 6, on the counter substrate CT. The color filter FL' has the same structure as that of the fifth embodiment shown in FIG. 5.

In general, the color purity increases with an increase in the thickness of a color filter, while the brightness decreases with an increase in the thickness of the color filter. That is, there is a trade-off between color purity and brightness. In the liquid crystal display panels shown in FIGS. 1 to 4, a single color filter FL is provided on the counter substrate CT side. When an image is displayed using this structure, external light comes into the reflection member through the color filter FL, and then goes out through the color filter FL once again as reflection light. In contrast, light from the backlight unit BL comes to the apertures GP of the light-shielding wiring pattern SL, and then goes out through the color filter FL as transmission light. It follows from this that a reflection image is displayed using the reflection light that has passed through the color filter FL twice, while a transmission image is displayed using the transmission light that has passed through the color filter FL only once. If the brightness and color purity of the reflection image are optimized, the color quality of the transmission image is degraded due to insufficient color purity. However, in the case shown in FIG. 6 where color filter FL is provided on the counter substrate CT side and color filter FL' is provided on the array substrate AR side, a reflection image is displayed using the reflection light that has passed through the color filter FL twice, while a transmission image is displayed using the transmission light that has passed through the color filter FL once and passed through the color filter FL' once (i.e., the transmission light passes through the two color filters). The spectral characteristics of the color filters FL' and FL can be optimized such that the color purity and brightness are balanced between the reflection image and the transmission image. By virtue of this, the color purity of the transmission image can be improved without impairing the color purity of the reflection image by about 50% compared with that of the third to fifth embodiments.

Figure 7:
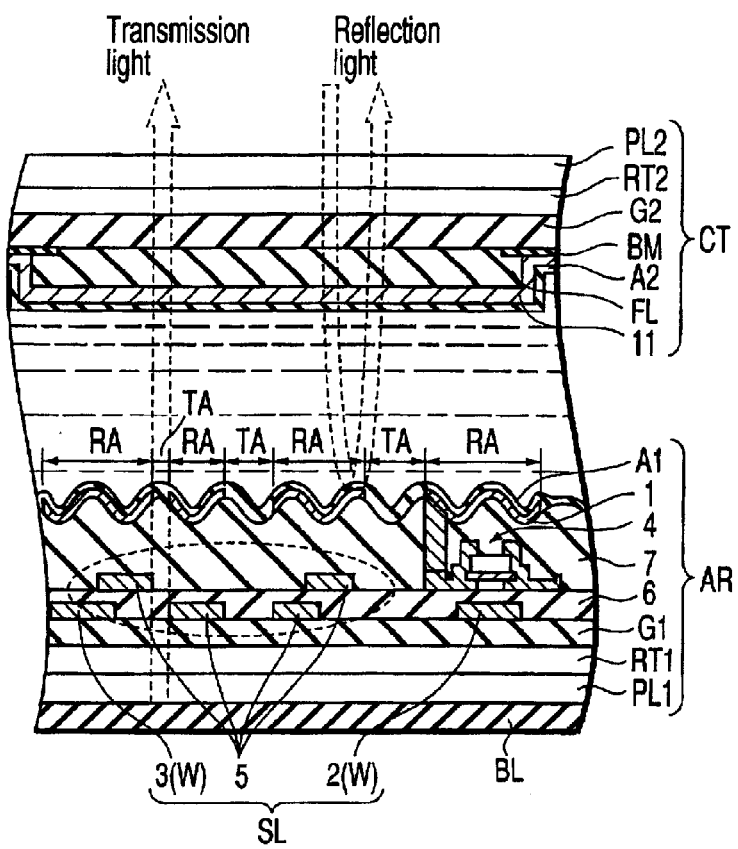
FIG. 7 is a sectional view showing a modification of the pixel electrode shown in FIG. 1.
Figure 8:
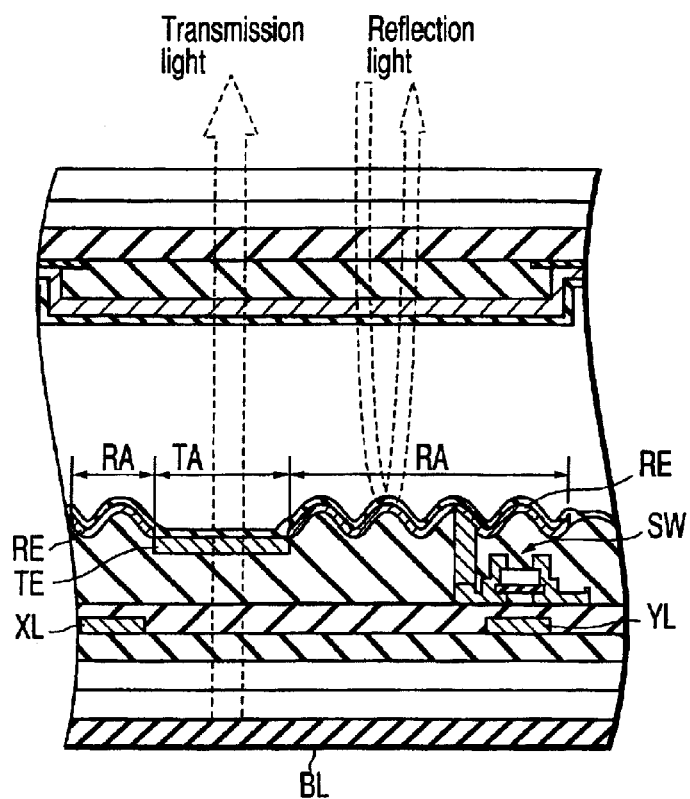
FIG. 8 is a sectional view showing part of a conventional liquid crystal display panel that uses both transmission light and reflection light.

The present invention is not limited to the above embodiments, and can be modified in various manners without departing from the spirit and scope of the invention. For example, the transparent pixel electrodes 1 shown in FIG. 1 may be replaced with reflective pixel electrodes 1 of a metallic material which overlap the memory wiring layers 5 such that the gaps therebetween are left unmasked. In this case, the reflective pixel electrodes 1 not only serve as a reflection member which reflects light incident thereon from the counter substrate CT side through the liquid crystal layer LQ, but also apply electric fields to the liquid crystal layer LQ. With this structure as well, the effective transmission area can be optimized with respect to the light that comes from the rear side of the array substrate AR and goes out through the gaps of the memory wiring layers 5. Moreover, since the reflective pixel electrodes 1 shown in FIG. 7 have undulations for diffusing light, the light diffusion layer 12 shown in FIG. 12 need not be formed on the counter substrate CT.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display panel comprising:
  light-transmitting first and second electrode substrates; and
  a liquid crystal layer held between said first and second electrode substrates and containing liquid crystal molecules whose alignment is controlled from said first and second electrode substrates, wherein said first electrode substrate includes:
    a pixel electrode which is disposed at a pixel area and applies an electric field to said liquid crystal layer,
    a thin film transistor formed as a switching element for said pixel electrode,
    a light-shielding wiring pattern having a plurality of memory wiring layers connected to said pixel electrode and said thin film transistor, and one or more apertures which allow transmission of light applied from a rear side of said first electrode substrate toward the liquid crystal layer, and
    a reflection member which reflects incident light applied from a second electrode substrate side through said liquid crystal layer, and overlaps said light-shielding wiring pattern such that said one or more apertures are left unmasked in the pixel area.

2. A liquid crystal display panel according to claim 1, wherein said pixel electrode is a transparent electrode located closer to said liquid crystal layer than said light-shielding wiring pattern.

3. A liquid crystal display panel according to claim 2, wherein said reflection member includes at least one of said memory wiring layer, a reflective material layer formed on said memory wiring layer, and a reflective material layer formed on said transparent electrode.

4. A liquid crystal display panel according to claim 3, wherein said reflective material layer formed on said transparent electrode has a total area not less than 60% of that of the memory wiring layers.

5. A liquid crystal display panel according to claim 3, wherein said light-shielding wiring pattern further includes a plurality of control wiring layers for said thin film transistor, and said memory wiring layer is formed of the same metallic material as at least one of said control wiring layers.

6. A liquid crystal display panel according to claim 5, wherein said reflective material layer comprises one of a highly reflective metallic material, a high-melting point metallic material, and a combination of the highly reflective and high-melting point metallic materials.

7. A liquid crystal display panel according to claim 6, wherein said highly reflective metallic material includes one of aluminum and silver as a major component.

8. A liquid crystal display panel according to claim 6, wherein said high-melting point metallic material includes one of molybdenum, tungsten, and a molybdenum-tungsten alloy.

9. A liquid crystal display panel according to claim 2, wherein said first electrode substrate further includes a color filter which covers the light-shielding wiring pattern and serves as an underlayer of said transparent electrode.

10. A liquid crystal display panel according to claim 1, wherein said reflection member has a reflection characteristic in which more than 40% of incident light is reflected.

11. A liquid crystal display panel according to claim 1, wherein said reflection member has a reflection characteristic in which more than 80% of incident light is reflected.

12. A liquid crystal display panel according to claim 1, wherein said second electrode substrate includes a light diffusion layer which diffuses light.

13. A liquid crystal display panel according to claim 1, wherein said reflection member includes undulations which diffuse light.

14. A liquid crystal display panel according to claim 1, wherein at least one of said first and second electrode substrates further includes a color filter.

* * * * *